US007751366B2

(12) United States Patent
Kwon

(10) Patent No.: US 7,751,366 B2
(45) Date of Patent: Jul. 6, 2010

(54) MOBILE COMMUNICATION TERMINAL AND METHOD OF TUNING BROADCAST FREQUENCY IN A MOBILE TERMINAL

(75) Inventor: Tae Jung Kwon, Daejeon (KR)

(73) Assignee: LG Electronics Inc., Seoul (KR)

( * ) Notice: Subject to any disclaimer, the term of this patent is extended or adjusted under 35 U.S.C. 154(b) by 585 days.

(21) Appl. No.: 11/768,717

(22) Filed: Jun. 26, 2007

(65) Prior Publication Data
US 2008/0057966 A1   Mar. 6, 2008

(30) Foreign Application Priority Data
Sep. 5, 2006   (KR)   ................ 10-2006-0085268

(51) Int. Cl.
*H04W 4/00*   (2009.01)
(52) U.S. Cl. .................. 370/331; 455/436
(58) Field of Classification Search ................ None
See application file for complete search history.

(56) References Cited

U.S. PATENT DOCUMENTS

| 6,522,888 | B1 * | 2/2003 | Garceran et al. | 455/456.3 |
| 2005/0233705 | A1 * | 10/2005 | Vare et al. | 455/70 |
| 2006/0084435 | A1 * | 4/2006 | Borsos et al. | 455/436 |
| 2008/0031193 | A1 * | 2/2008 | Laroia et al. | 370/331 |

FOREIGN PATENT DOCUMENTS

GB   2 418 571 A   3/2006

WO   WO 2004/107794 A   12/2004

OTHER PUBLICATIONS

"3rd Generation partnership project; Technical Specification Group Radio Acess Network; Introduction of the Multimedia Broadcast Multicast Service in the Radio Access Network; Stage 2, Release 6" 3GPP TS 25.346 V6.8.0, Jun. 1, 2006, pp. 1-59, XP002464110 * p. 55-p. 56 * * p. 23, paragraph 6.2.1.1 * * p. 43, paragraph- 8. 3. 2 - p. 45 *.
"3rd Generation Partnership Project; Technical Specification Group GSM/Edge radio access network; Multimedia Broadcast Multicast Service (MBMS) in the GERAN; Stage 2, (Release 6)" 3GPP TS 43246 V 6.8.0, Jun. 1, 2006, pp. 1-32, XP002464111 * p. 16, paragraph 6.2.1 *.
Nokia: "Refactoring of Information ni the MBMS Neighbouring Cell Information Message" 3GPP TSG GERAN 325, XX, XX, Jun. 20, 2005, pp. 1-8, XP003004239 *the whole document*.

* cited by examiner

*Primary Examiner*—Ajit Patel
(74) *Attorney, Agent, or Firm*—Lee, Hong, Degerman, Kang & Waimey

(57) ABSTRACT

A mobile communication terminal and method of tuning a broadcast frequency in a mobile communication terminal are provided that reduces a time for performing frequency tuning when handover occurs during broadcast reception in a communication terminal. The present invention includes receiving a broadcast signal including location information, frequency link information, and transmission signal identification information, obtaining current cell information of the mobile communication terminal and neighbor cell information using the location information, obtaining frequency information of a neighbor cell to the mobile communication terminal using the frequency link information, and searching for the frequency matched to a currently received broadcast signal using the obtained frequency information for the neighbor cell and the transmission signal identification information.

20 Claims, 4 Drawing Sheets

MOBILE COMMUNICATION TERMINAL AND METHOD OF TUNING BROADCAST FREQUENCY IN A MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2006-0085268, filed on Sep. 5, 2006, the contents of which is incorporated by reference herein in its entirety.

FIELD OF THE INVENTION

The present invention relates to a mobile communication terminal capable of receiving a broadcast, and specifically, to a mobile communication terminal and method of tuning a broadcast frequency in a mobile communication terminal. Although the present invention is suitable for a wide scope of applications, it is particularly suitable for tuning a frequency corresponding to a received broadcast signal when performing handover while receiving a broadcast.

DESCRIPTION OF THE RELATED ART

Generally, handover occurs when a mobile communication terminal moves into a neighbor cell during communication. Handover refers to a mobile communication terminal tuning to a new communication channel of a neighbor base station when moving away from a present base station service area and into a neighbor base station service area during communication.

Mobile communication terminals capable of receiving broadcasts have recently been developed. It is necessary to tune a frequency matched to a currently broadcast transport stream in order for a user of a mobile communication terminal to continue viewing the currently viewed broadcast if handover occurs while the broadcast is viewed.

FIG. 1 is a diagram for explaining a frequency tuning failure during handover. As illustrated in FIG. 1, a mobile communication terminal 10 is tuned to frequency $f_N$ for receiving a transport stream TS1 corresponding to a service X and moves into a neighbor area. Assuming that a frequency list descriptor (frequency_list_descriptor) included in a broadcast signal indicates a frequency for receiving the TS1 is $f_A$ or $f_B$, there is no problem if the mobile communication terminal 10 moves into an area, such as (c) or (d), in which TS1 is received on fA or fB.

However, there is a problem if the mobile communication terminal 10 moves away into an area, such as (a) or (b), in which TS2 is received on $f_A$ or $f_B$. In this case, the mobile communication terminal 10 tuned to $f_A$ or $f_B$ will receive TS2. Therefore, the mobile communication terminal 10 fails to frequency tune correctly and must perform confirmations on all frequencies in order to properly tune, a process that takes considerable time.

As illustrated, frequency tuning frequently fails during handover in a related art mobile communication terminal. Furthermore, even successful frequency tuning takes a considerable time.

SUMMARY OF THE INVENTION

In one aspect of the present invention, a method of tuning a frequency in a mobile communication terminal when handover occurs is provided. The method includes receiving a broadcast signal including location information and frequency link information, obtaining first information related to a cell in which the mobile communication terminal is currently located and second information related to a neighbor cell, the first information and second information obtained using the location information, obtaining third information related to a frequency used in the neighbor cell, the third information obtained using the frequency link information and searching for a frequency matched to a currently received broadcast signal using the obtained first information, second information and third information.

It is contemplated that the location information includes an identifier of the cell in which the mobile communication terminal is currently located and an identifier of the neighbor cell. It is further contemplated that the frequency link information includes information for matching a frequency used in the cell in which the mobile communication terminal is currently located and a frequency used in the neighbor cell.

It is contemplated that the method further includes determining that the frequency matched to the currently received broadcast signal is found and receiving the broadcast signal in the neighbor cell to which the mobile communication terminal has moved. It is further contemplated that the method further includes reconfiguring the broadcast signal into a specific data format and extracting the first information, second information and third information from the specific data format.

It is contemplated that the received broadcast signal further includes transmission signal identification information and further including obtaining the transmission signal identification information and searching for the frequency matched to the currently received broadcast signal using the transmission signal identification information. It is further contemplated that the method further includes reconfiguring the broadcast signal into a specific data format and extracting the first information, second information, third information and transmission signal identification information from the specific data format.

It is contemplated that the received broadcast signal further includes service identification information and further including obtaining the service identification information and searching for the frequency matched to the currently received broadcast signal using the service identification information. It is further contemplated that the method further includes reconfiguring the broadcast signal into a specific data format and extracting the first information, second information, third information, transmission signal identification information and service identification information from the specific data format. Preferably, the broadcast signal is received as a transport stream including program specific information and service information.

In another aspect of the present invention, a mobile communication terminal for receiving a broadcast is provided. The mobile communication terminal includes a tuner receiving a broadcast signal including location information and frequency link information and a control unit performing a handover process to obtain first information related to a cell in which the mobile communication terminal is currently located, second information related to a neighbor cell, and third information related to a frequency used in the neighbor cell and controlling the tuner to search for a frequency matched to a currently received broadcast signal using the obtained first information, second information and third information, wherein the control unit obtains the first information and second information using the location information and obtains the third information using the frequency link information.

It is contemplated that the location information includes an identifier of the cell in which the mobile communication terminal is currently located and an identifier of the neighbor cell. It is further contemplated that the frequency link information includes information for matching a frequency used in the cell in which the mobile communication terminal is currently located and a frequency used in the neighbor cell.

It is contemplated that the control unit determines that the frequency matched to the currently received broadcast signal is found and controls the tuner to receive the broadcast signal in the neighbor cell to which the mobile communication terminal has moved. It is further contemplated that the mobile communication terminal further includes a baseband processing unit reconfiguring the broadcast signal into a specific data format and wherein the control unit extracts the first information, second information and third information from the specific data format.

It is contemplated that the received broadcast signal further includes transmission signal identification information and wherein the control unit obtains the transmission signal identification information and searches for the frequency matched to the currently received broadcast signal using the transmission signal identification information. It is further contemplated that the mobile communication terminal further includes a baseband processing unit reconfiguring the broadcast signal into a specific data format and wherein the control unit extracts the first information, second information, third information and transmission signal identification information from the specific data format.

It is contemplated that the received broadcast signal further includes service identification information and wherein the control unit obtains the service identification information and searches for the frequency matched to the currently received broadcast signal using the service identification information. It is further contemplated that the mobile communication terminal further includes a baseband processing unit reconfiguring the broadcast signal into a specific data format and wherein the control unit extracts the first information, second information, third information, transmission signal identification information and service identification information from the specific data format. Preferably, the tuner receives the broadcast signal as a transport stream including program specific information and service information.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

A mobile communication terminal according to the present invention may be any portable electronic device carried by a user. For example, the electronic device may be a mobile phone, a digital broadcast terminal, an MP3 player, a PDA (personal digital assistant), or a PMP (portable multimedia player).

The frequency tuning methods of the present invention are applicable to various broadcasting standards. For example, the methods are applicable to DVB-H (digital video broadcasting-handheld) and DMB (digital multimedia broadcasting).

Figure 1:
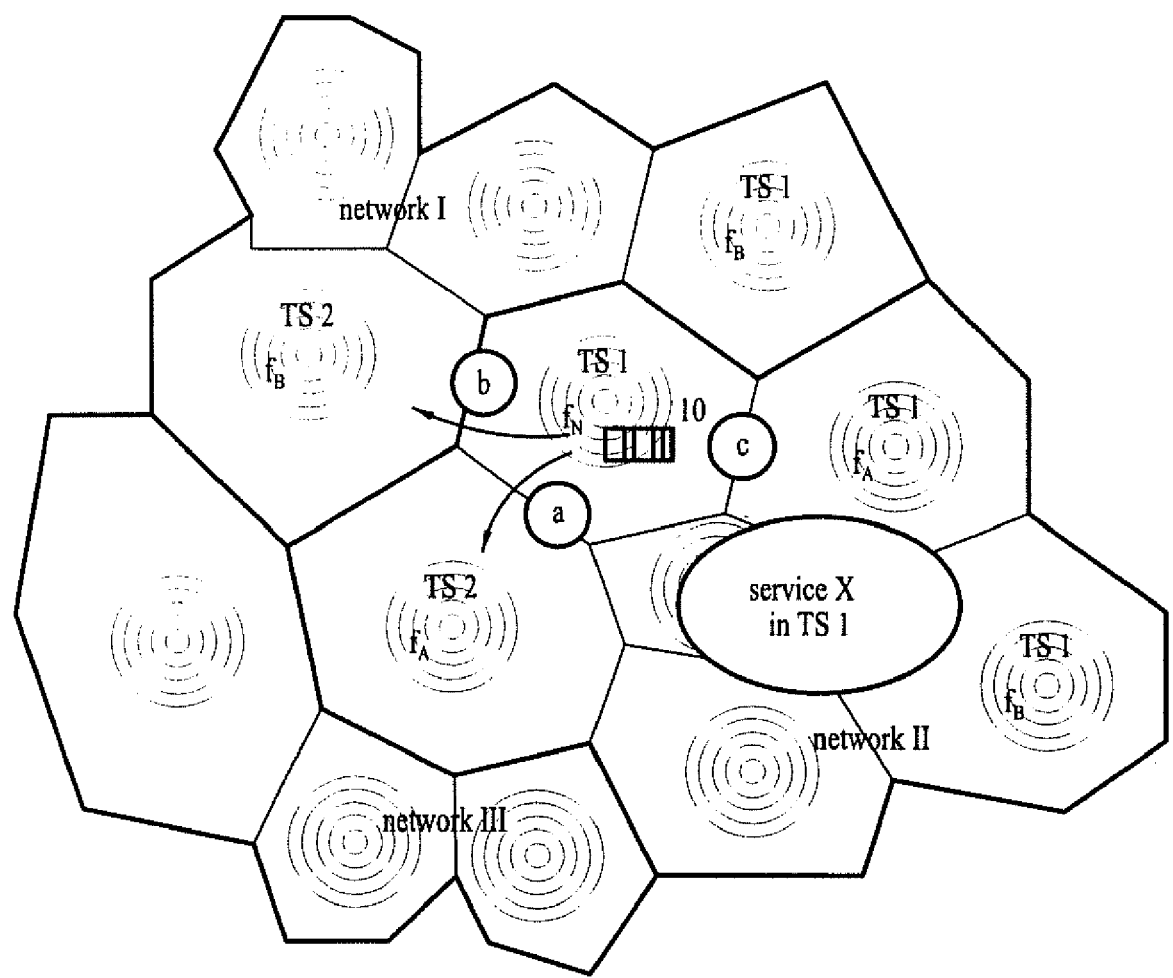
FIG. 1 is a diagram for explaining a frequency tuning failure during handover.
Figure 2:
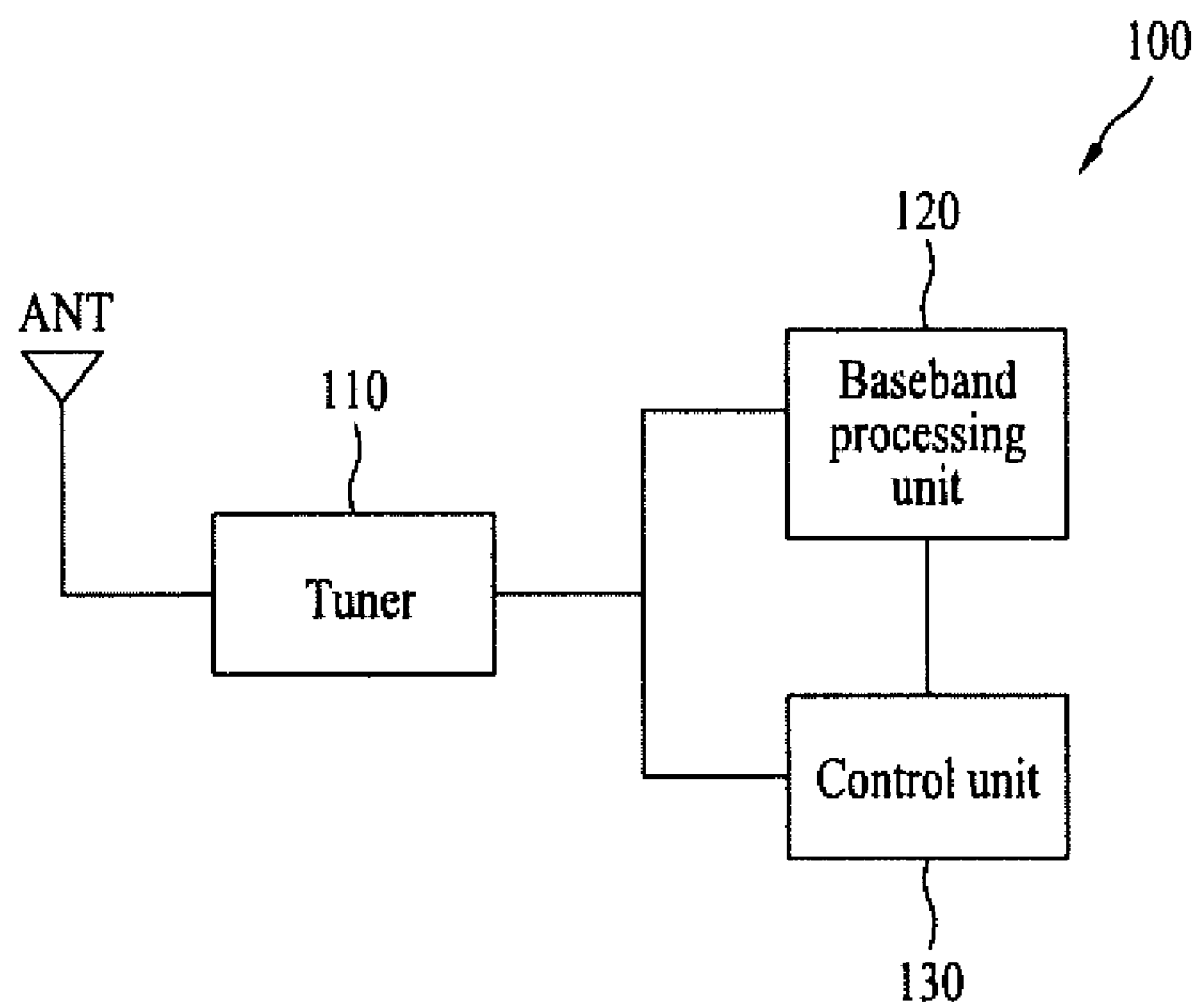
FIG. 2 is a block diagram of a mobile communication terminal according to one embodiment of the present invention.

FIG. 2 is a block diagram of a mobile communication terminal 100 according to one embodiment of the present invention. The mobile communication terminal 100 includes a tuner 110, a baseband processing unit 120, and a control unit 130.

Figure 3:
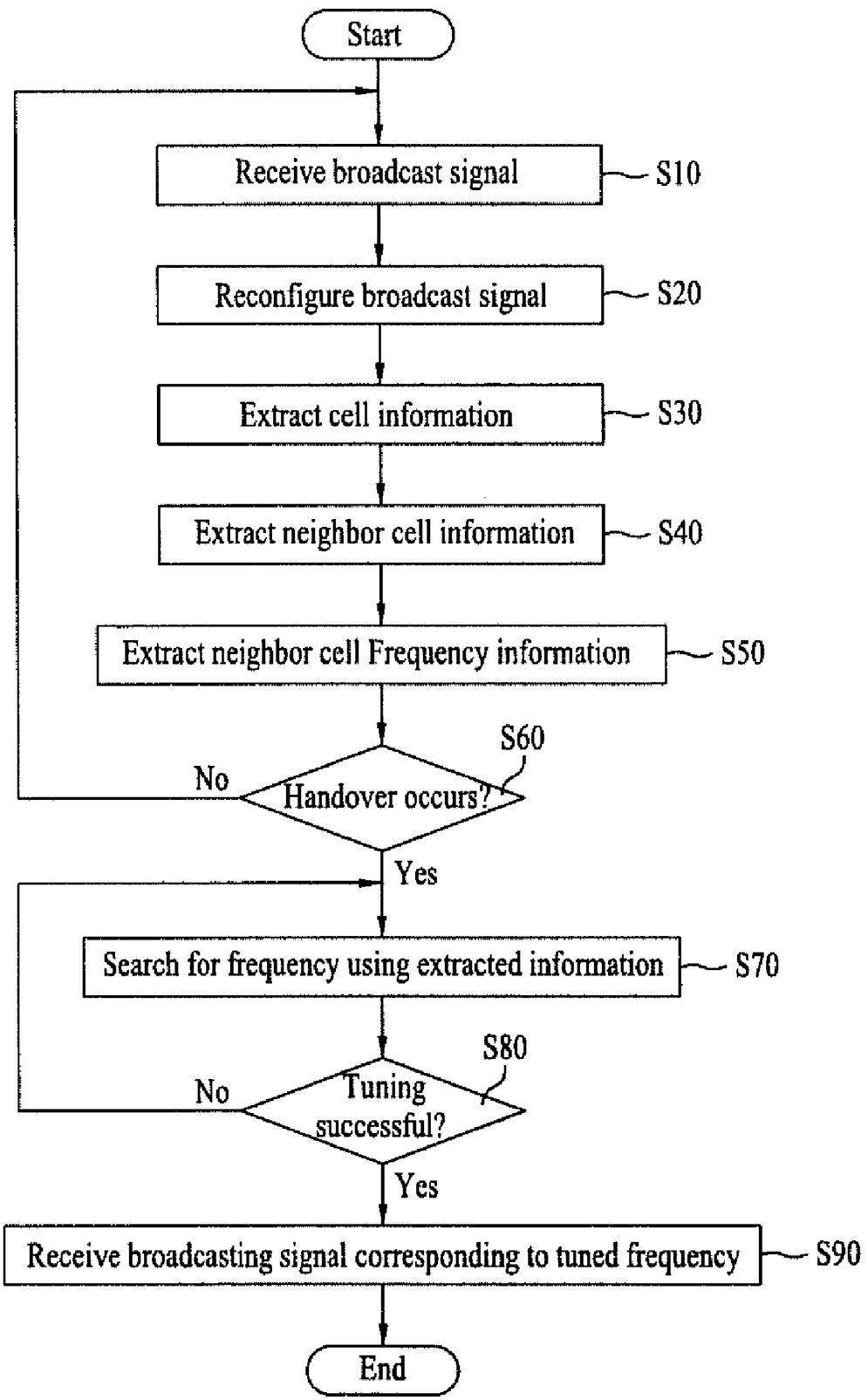
FIG. 3 and FIG. 4 are flowcharts of frequency tuning methods in a mobile communication terminal according to embodiments of the present invention.

FIG. 3 is a flowchart of a frequency tuning method in a mobile communication terminal 100 according to one embodiment of the present invention. The method of tuning a frequency during handover in a mobile communication terminal 100 according to FIG. 3 is explained with further reference to FIG. 2.

The mobile communication terminal 100 receives a broadcast signal via an antenna ANT (S10). The broadcast signal can be received in a format such as a transport stream (hereinafter abbreviated TS) carried by a specific frequency. The mobile communication terminal 100 searches for a specific frequency and then selectively receives the broadcast signal corresponding to the specific frequency only.

The tuner 110 facilitates receiving a specific broadcast signal by selecting a prescribed frequency band signal from broadcast signals received via the antenna ANT The tuner 110 tunes a specific frequency and then selectively receives a corresponding broadcast signal.

Handover may occur according to a location shift of the mobile communication terminal 100. In this case, location information and frequency link information may be included in the broadcast signal to enable effective frequency tuning.

The 'location information' is information related to a present location of the mobile communication terminal 100. The location information may include location information related to a cell. An example of location information related to a cell is a cell list descriptor (cell_list_descriptor), which lists information for locations of cells.

A current cell identifier (cell_id) and a neighbor cell identifier (cell_id_extension) may be obtained through the cell list descriptor. Information related to the cell where the mobile communication terminal 100 is presently located and the information related to a neighbor cell may be obtained using the cell identifier (cell_id) and the neighbor cell identifier (cell_id extension). Specifically, the cell identifier (cell_id) may be included in bits of TPS (transmitter parameter signaling) within a transport stream.

The 'frequency link information' is information for matching a frequency used by a current cell with a frequency used by a neighbor cell. An example of the frequency link information is a cell frequency link descriptor (cell_frequency_link_descriptor).

The location information and the frequency link information may be extracted from program specific information and service information included in a broadcast signal.

The baseband processing unit 120 receives the broadcast signal including the program specific information and the service information via the tuner 110 and reconfigures the received signal into a data format such as a table (S20). The location information and frequency link information may be included in the reconfigured data format.

The control unit 130 interprets the data format and extracts the cell information, the neighbor cell information, and the neighbor cell frequency information from the interpreted data format (S30 to S50). The data format is based on the program specific information (PSI) and service information (SI) tables delivered from the baseband processor 120.

A NIT (network information table or network identification table) is preferentially and fixedly interpreted when interpreting the PSI and SI tables. A BAT (bouquet association table) or PAT (program association table) is subsequently interpreted and INT (IP/MAC notification table) information is then referred to.

Basic information associated with a service channel is searched from the INT (IP/MAC notification table). PAT and PMT table information is finally referred to in order to reconfigure a stream associated with the corresponding channel.

Various types of descriptors exist in each of the tables. The descriptors are referred to and utilized though, for example, their unique tag information. Descriptors associated with handover are included in the NIT If handover occurs in the mobile communication terminal 100 (S60), the control unit 130 enables the tuner 110 to search for a frequency corresponding to a currently received broadcast signal using the extracted information (S70). For example, frequency tuning may be repeated by searching frequencies used only by neighbor cells.

Once the frequency tuning succeeds (S80), a broadcast signal corresponding to the tuned frequency may be received (S90). The mobile terminal 100 is then able to continue viewing a currently received broadcast.

The location information and the frequency link information received and obtained by the mobile communication terminal 100 may be defined by a format according to a predetermined protocol between a transmitting side and a receiving side. Specifically, the location information and frequency link information may be represented in syntax form.

Cell list descriptor (cell_list_descriptor), which is an example of cell location information, may be represented as illustrated in Table 1. Cell frequency link descriptor (cell_link_descriptor), which is an example of frequency link information, may be represented as illustrated in Table 2.

TABLE 1

| Syntax | Number of bits | Identifier |
|---|---|---|
| cell_list_descriptor( ){ | | |
| descriptor_tag | 8 | uimsbf |
| descriptor_length | 8 | uimsbf |
| for (i=0; i<N, i++){ | | |
| cell_id | 16 | uimsbf |
| cell_latitude | 16 | uimsbf |
| cell_longitude | 16 | uimsbf |
| cell_extent_of_latitude | 12 | uimsbf |
| cell_extent_of_longitude | 12 | uimsbf |
| subcell_info_loop_length | 8 | uimsbf |
| for (j=0; j<N; j++) { | | |
| cell_id_extension | 8 | uimsbf |
| subcell_latitude | 16 | uimsbf |
| subcell_longitude | 16 | uimsbf |
| subcell_extent_of_latitude | 12 | uimsbf |
| subcell_extent_of_longitude | 12 | uimsbf |
| } | | |
| } | | |
| } | | |

The cell_frequency_link_descriptor and cell_list_descriptor may be included in a NIT (Network Information Table or Network Identification Table) contained in the program specific information (PSIT) and the service information (SI).

The location information may be obtained through the frequency tuning method of the mobile communication terminal 100. In this way, frequencies for neighbor areas adjacent to a present location of the mobile terminal 100 are searched in order to reduce the number of frequency search retrials and accomplish tuning in a short time. The mobile communication terminal 100 is able to perform frequency search more precisely and quickly when handover occurs by using information relating a frequency to a broadcast signal for a currently broadcast in addition to the information related to the frequencies of the neighbor cells.

TABLE 2

| Syntax | Number of bits | Identifier |
|---|---|---|
| cell_frequency_link_descriptor( ){ | | |
| descriptor_tag | 8 | uimsbf |
| descriptor_length | 8 | uimsbf |
| for (i=0; i<N, i++){ | | |
| cell_id | 16 | uimsbf |
| frequency | 32 | uimsbf |
| subcell_info_loop_length | 8 | uimsbf |
| for (j=0; j<N; j++) { | | |
| cell_id_extension | 8 | uimsbf |
| transport_frequency | 32 | uimsbf |
| } | | |
| } | | |
| } | | |

Figure 4:
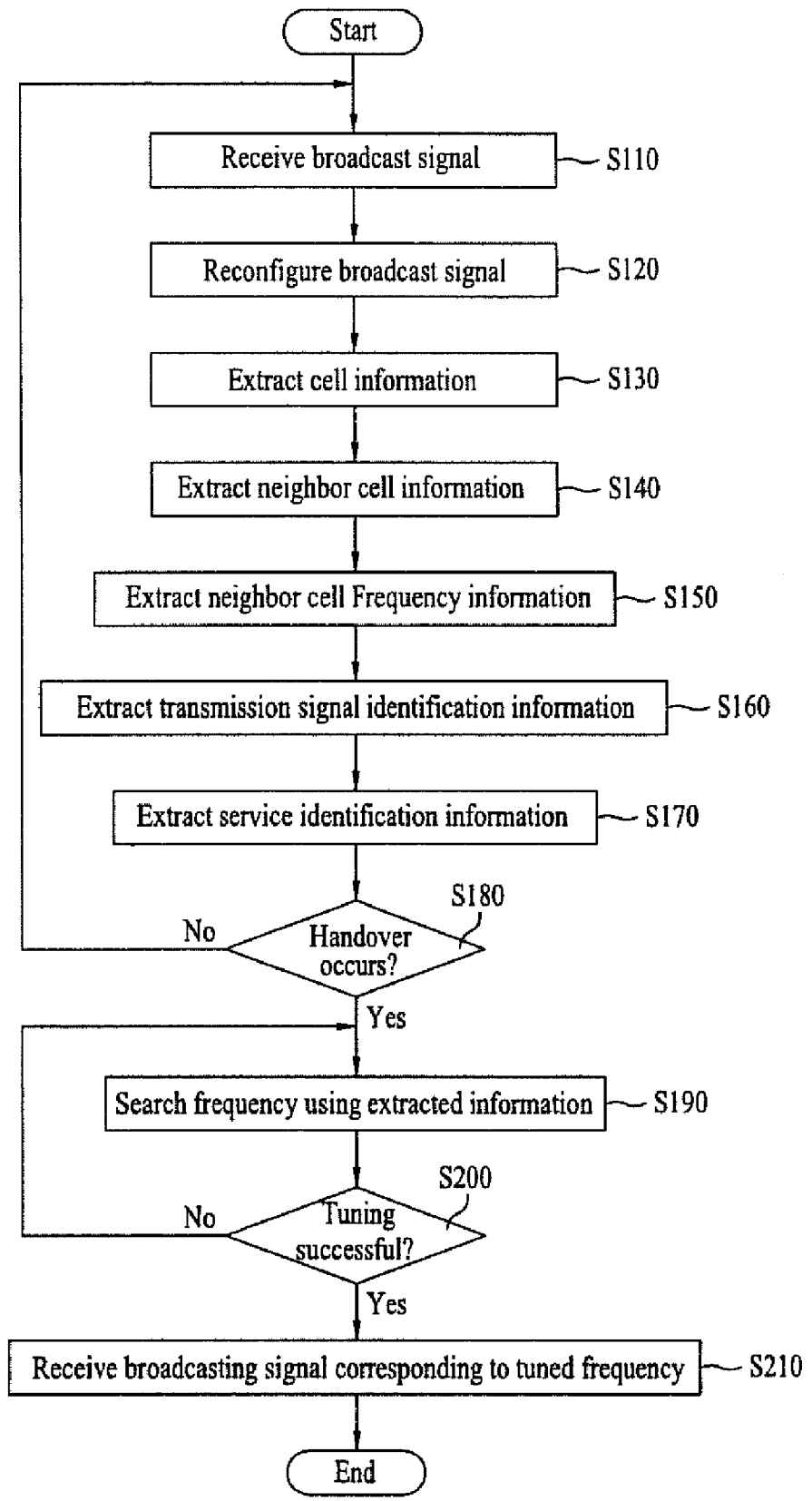

The terms used in Table 1 and Table 2 have the following meanings:

descriptor_tag: Definition of information transfer data structure type descriptor_length: Descriptor length cell_id: Cell identifier cell_latitude, cell_longitude: Cell position obtaining information cell_extent_of_latitude, cell_extent_of_longitude: Cell position obtaining information subcell_info_loop_length: Number of neighbor cells cell_id_extension: Neighbor cell identifier Frequency: Frequency Transposer_frequency: frequency transformed by a frequency transform signal generator FIG. 4 is a flowchart of a frequency tuning method in a mobile communication terminal 100 according to another embodiment of the present invention. The method of tuning a frequency using information relating frequency to a broadcast signal for a currently received broadcast, as illustrated in FIG. 4, is explained in detail with further reference to FIG. 2. The portions of the method that are the same as the method illustrated in FIG. 3 are omitted or described schematically.

The mobile communication terminal 100 receives a broadcast signal via an antenna ANT (S110). The broadcast signal may be received in a format such as a TS.

The tuner 110 facilitates receiving a specific broadcast signal by selecting a prescribed frequency band signal from broadcast signals received via the antenna ANT. Specifically, the tuner 110 tunes a specific frequency and then selectively receives a corresponding broadcast signal.

Handover may occur according to a location shift of the mobile communication terminal 100. In this case, location information, frequency link information, transmission signal identification information, and service identification information may be included in the broadcast signal to enable effective frequency tuning.

The location information and frequency link information have previously been explained with respect to FIG. 3. The transmission signal identification information and service identification information are examples of the relationship between a currently received broadcast signal and a frequency.

The 'transmission identification information' is information for differentiating between transport streams. For example, signals broadcast by one group of broadcasting stations may be included in a first transport stream TS1 and signals broadcast by another group of broadcasting stations may be included in a second transport stream TS2. An identifier for each of the transport streams TS1 and TS2 are examples of transmission signal identification information. An example of an identifier for a transport stream that is represented as syntax is transport_id.

The 'service identification information' is information for differentiating between broadcast services included in each transport stream. For example, the service identification information may be information for differentiating between broadcast services included in the transport stream TS1 that are broadcast from each broadcast station in one group. The service identification information may include a service identifier. An example of a service identifier that is represented as syntax is service_id.

The location information, the frequency link information, the transmission signal identification information, and the service identification information can be extracted from program specific information and service information included in a broadcast signal.

The amount of data transmitted in a broadcast signal may be reduced by omitting the service identification information from the information relating a currently received broadcast signal to a frequency, thereby facilitating inclusion of the transmission signal identification information in the broadcast signal.

The baseband processing unit 120 receives the broadcast signal including the program specific information and the service information via the tuner 110 and reconfigures the received signal into a data format such as a table (S120). Location information and frequency link information may be included in the reconfigured data format.

The control unit 130 interprets the data format and extracts the cell information, the neighbor cell information, the neighbor cell frequency information, the transmission signal identification information, and the service identification information from the interpreted data format (S130 to S170). If the service identification information is not transmitted, the service identification information extracting step (S170) is omitted.

When handover occurs in the mobile communication terminal 100 (S180), the control unit 130 enables the tuner 110 to search for a frequency corresponding to a currently received broadcast signal using the extracted information (S180). For example, frequencies used by neighbor cells are searched for a specific frequency matched to a received transmission signal identifier and a service identifier.

Once the frequency tuning is successful (S200), a broadcast signal corresponding to the tuned frequency can be received (S210). The mobile terminal 100 is then able to continue viewing a currently received broadcast.

The information relating the currently received broadcast signal to the frequency that is used for the frequency tuning method illustrated in FIG. 4 may be represented as syntax. For example, this information may be represented as service_frequency_link_descriptor, which can be represented as follows:

```
service_frequency_link_descriptor( ){
    descriptor_tag
    descriptor_length
    for (i=0; i<N, i++){
        frequency
        for (j=0; j<N; j++) {
            service_id
                transport_stream_id
        }
    }
}
```

As mentioned in the foregoing description, the method illustrated in FIG. 4 adds the service_frequency_link_descriptor to the INT In this way, the method illustrated in FIG. 4 improves the method of searching frequencies of neighbor cells by eliminating the inconvenience of re-search when a stream transported via the searched frequency is not identical.

The present invention provides several advantages. First, the number of frequency tuning failures is reduced, thereby preventing unnecessary waste of time. Second, the service quality is enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of tuning a frequency in a mobile communication terminal when handover occurs, the method comprising:
    receiving a broadcast signal comprising location information and frequency link information;
    obtaining first information related to a cell in which the mobile communication terminal is currently located and second information related to a neighbor cell, the first information and second information obtained using the location information;
    obtaining third information related to a frequency used in the neighbor cell, the third information obtained using the frequency link information; and
    searching for a frequency matched to a currently received broadcast signal using the obtained first information, second information and third information.

2. The method of claim 1, wherein the location information comprises an identifier of the cell in which the mobile communication terminal is currently located and an identifier of the neighbor cell.

3. The method of claim 1, wherein the frequency link information comprises information for matching a frequency used in the cell in which the mobile communication terminal is currently located and a frequency used in the neighbor cell.

4. The method of claim 1, further comprising:
    determining that the frequency matched to the currently received broadcast signal is found; and
    receiving the broadcast signal in the neighbor cell to which the mobile communication terminal has moved.

5. The method of claim 1, further comprising:
    reconfiguring the broadcast signal into a specific data format; and
    extracting the first information, second information and third information from the specific data format.

6. The method of claim 1 the received broadcast signal further comprising transmission signal identification information and further comprising:
    obtaining the transmission signal identification information; and
    searching for the frequency matched to the currently received broadcast signal using the transmission signal identification information.

7. The method of claim 6, further comprising:
    reconfiguring the broadcast signal into a specific data format; and
    extracting the first information, second information, third information and transmission signal identification information from the specific data format.

8. The method of claim 6, the received broadcast signal further comprising service identification information and further comprising;
    obtaining the service identification information; and
    searching for the frequency matched to the currently received broadcast signal using the service identification information.

9. The method of claim 8, further comprising:
    reconfiguring the broadcast signal into a specific data format; and
    extracting the first information, second information, third information, transmission signal identification information and service identification information from the specific data format.

10. The method of claim 1, wherein the broadcast signal is received as a transport stream comprising program specific information and service information.

11. A mobile communication terminal for receiving a broadcast, the mobile communication terminal comprising:
    a tuner receiving a broadcast signal comprising location information and frequency link information; and
    a control unit performing a handover process to obtain first information related to a cell in which the mobile communication terminal is currently located, second information related to a neighbor cell, and third information related to a frequency used in the neighbor cell and controlling the tuner to search for a frequency matched to a currently received broadcast signal using the obtained first information, second information and third information,
    wherein the control unit obtains the first information and second information using the location information and obtains the third information using the frequency link information.

12. The mobile communication terminal of claim 11, wherein the location information comprises an identifier of the cell in which the mobile communication terminal is currently located and an identifier of the neighbor cell.

13. The mobile communication terminal of claim 11 wherein the frequency link information comprises information for matching a frequency used in the cell in which the mobile communication terminal is currently located and a frequency used in the neighbor cell.

14. The mobile communication terminal of claim 11, wherein the control unit determines that the frequency matched to the currently received broadcast signal is found and controls the tuner to receive the broadcast signal in the neighbor cell to which the mobile communication terminal has moved.

15. The mobile communication terminal of claim 11, further comprising a baseband processing unit reconfiguring the broadcast signal into a specific data format and wherein the control unit extracts the first information, second information and third information from the specific data format.

16. The mobile communication terminal of claim 11, the received broadcast signal further comprising transmission signal identification information and wherein the control unit obtains the transmission signal identification information and searches for the frequency matched to the currently received broadcast signal using the transmission signal identification information.

17. The mobile communication terminal of claim 16, further comprising a baseband processing unit reconfiguring the broadcast signal into a specific data format and wherein the control unit extracts the first information, second information, third information and transmission signal identification information from the specific data format.

18. The mobile communication terminal of claim 16, the received broadcast signal further comprising service identification information and wherein the control unit obtains the service identification information and searches for the frequency matched to the currently received broadcast signal using the service identification information.

19. The mobile communication terminal of claim 18, further comprising a baseband processing unit reconfiguring the broadcast signal into a specific data format and wherein the control unit extracts the first information, second information, third information, transmission signal identification information and service identification information from the specific data format.

20. The mobile communication terminal of claim 11, wherein the tuner receives the broadcast signal as a transport stream comprising program specific information and service information.

* * * * *